(12) United States Patent
Mori

(10) Patent No.: US 8,371,348 B2
(45) Date of Patent: Feb. 12, 2013

(54) PNEUMATIC TIRE

(75) Inventor: Arata Mori, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 59 days.

(21) Appl. No.: 12/865,616

(22) PCT Filed: Dec. 25, 2008

(86) PCT No.: PCT/JP2008/073618
§ 371 (c)(1),
(2), (4) Date: Aug. 13, 2010

(87) PCT Pub. No.: WO2009/096133
PCT Pub. Date: Aug. 6, 2009

(65) Prior Publication Data
US 2011/0005651 A1    Jan. 13, 2011

(30) Foreign Application Priority Data

Jan. 31, 2008  (JP) ................. 2008-021164

(51) Int. Cl.
*B60C 11/13* (2006.01)
(52) U.S. Cl. ......... 152/209.18; 152/209.12; 152/209.21; 152/209.27
(58) Field of Classification Search ............. 152/209.12, 152/209.13, 209.18, 209.21, 209.22, 209.25, 152/209.27
See application file for complete search history.

(56) References Cited

U.S. PATENT DOCUMENTS 4,445,561 A    5/1984  Kono et al.
(Continued)

FOREIGN PATENT DOCUMENTS

| | | |
|---|---|---|
| EP | 1 775 144 A1 | 4/2007 |
| JP | 56-063065 U | 11/1982 |

(Continued)

OTHER PUBLICATIONS

European Search Report issued in European Application No. 08871720.2, dated Aug. 3, 2011.

(Continued)

*Primary Examiner* — Steven D Maki
*Assistant Examiner* — Robert Dye
(74) *Attorney, Agent, or Firm* — Sughrue Mion, PLLC

(57) ABSTRACT

The present invention provides a pneumatic tire in which the tread pattern is optimized to improve wear resistance. The pneumatic tire has a tread portion embedding belt layer therein, wherein the tread portion has plural rows of lag grooves extending from the tread end to a tire equatorial plane and a narrow groove connecting the end of two lag grooves clipping the tire equatorial plane, wherein the narrow groove will be closed when contacting the road surface, wherein said lag groove is composed of a first lag groove portion located on the outer side in the tire widthwise direction and a second lag groove portion located on the inner side in the tire widthwise direction, wherein the maximum depth of the second lag groove portion is larger than the maximum depth of the first lag groove portion, wherein the second lag groove portion, in a sectional view in the tire circumferential direction, is composed of a shallow groove portion and deep groove portion having a larger depth than the shallow groove portion notching a part of the shallow groove portion, wherein the length in the tire circumferential direction of the deep groove portion is smaller than the length in the tire circumferential direction of the shallow groove portion.

10 Claims, 5 Drawing Sheets

U.S. PATENT DOCUMENTS

| | | | |
|---|---|---|---|
| 6,347,653 | B1 | 2/2002 | Kobayashi |
| 2001/0045237 | A1 | 11/2001 | Monobe et al. |
| 2002/0056494 | A1 | 5/2002 | Nakamura |
| 2007/0199633 | A1* | 8/2007 | Hayashi .................. 152/209.18 |
| 2008/0041509 | A1* | 2/2008 | Shimizu ................... 152/209.16 |
| 2008/0289738 | A1* | 11/2008 | Nakamura et al. ....... 152/209.24 |

FOREIGN PATENT DOCUMENTS

| | | | |
|---|---|---|---|
| JP | 62-151101 | U | 9/1987 |
| JP | 63-25108 | A | 2/1988 |
| JP | 63025107 | A | 2/1988 |
| JP | 3-193507 | * | 8/1991 |
| JP | 5-286419 | * | 11/1993 |
| JP | 2000-233610 | A | 8/2000 |
| JP | 2001-213120 | A | 8/2001 |
| JP | 2004-155335 | A | 6/2004 |
| JP | 2006-327320 | A | 12/2006 |
| JP | 2006-347512 | A | 12/2006 |
| WO | WO2006013758 | * | 2/2006 |
| WO | WO2006082696 | * | 8/2006 |

OTHER PUBLICATIONS

International Search Report dated Mar. 17, 2009, 4 pages.
Chinese Office Action issued in Application No. 200880128425.3 dated Aug. 3, 2012.
English translation of Chinese Office Action issued in Application No. 200880128425.3 dated Aug. 3, 2012.
Japanese Office Action issued in Application No. 2008-021164 dated Sep. 25, 2012, with an English language translation.

* cited by examiner (A)

(B)

PNEUMATIC TIRE

TECHNICAL FIELD

The present invention relates to a pneumatic tire having a tread portion embedding belt layer therein, wherein the tread portion has plural rows of lug grooves extending from the tread end to a tire equatorial plane and a narrow groove connecting corresponding ends of two lug grooves on both sides of the tire equatorial plane, wherein the narrow groove will be closed when contacting the road surface and, in particular, a tire for heavy load. The present invention aims at enhancing wear resistance of such pneumatic tire.

PRIOR ART

In general, the pneumatic tire for heavy load has a rigid belt which enables the supporting of relative weight. Moreover, it is tended that the lug groove is arranged on the tread portion enable the traveling in various condition.

In the pneumatic tire for heavy load having such tread pattern, rigidity of belt is enhanced to enhance the rigidity of tread portion as a whole, to inhibit the wear. However, load of the pneumatic tire for heavy load is relatively high with respect to the pneumatic tire of the normal vehicle, and due to this, the wear resistance is not sufficient. Therefore, when a tire is rotated with a load applied thereon, the wear speed is fast and tire life is short. In order to prevent such problem, a gauge thickness of the tread portion has been raised and negative ratio has been reduced to raise tread volume to enhancement the tire life.

However, when such pneumatic tire is attached onto the vehicle as a driving wheel which transmits driving force, and when transmitting driving force to the road surface and the friction force burdened from road surface to the tread portion is larger in area at a tread ground end with respect to the area at the tire equatorial plane of the tread ground area, and therefore, area at a tread ground end will wear faster than the area at the tire equatorial plane, and uneven wear occurs to the tread portion as a whole. On the other hand, when such pneumatic tire is attached onto the vehicle as a wheel which do not transmit driving force, and when transmitting driving force to the road surface and the friction force burdened from road surface to the tread portion is larger in area at a tire equatorial plane with respect to the area at the tread ground end of the tread ground area, and therefore, area at a tire equatorial plane will wear faster than the area at the tread ground end, and uneven wear occurs to the tread portion as a whole. In view of this, uneven wear will result in the problem of reducing tire life.

As countermeasures against such problem, for example, as disclosed in JP 2004-155335A, in which a lug groove demarcating block land portions is partially shallowed, i.e. a partially raised bottom portion is provided in the lug groove, to enhance stress resisting collapse-deformation of block land portions in the tire circumferential direction, suppress increase in driving force exerted per unit area of the tread portion and prevent uneven wear due to the collapse-deformation from occurring.

In the invention disclosed in JP 2004-155335A, tire life has been elongated due to the enhancement of the uneven wear resistance, and the further improvement is desired.

An object of the present invention is to provide a pneumatic tire in which the tread pattern is optimized to enhance uneven wear resistance and elongate In order to achieve the aforementioned object, the present invention provides a pneumatic tire having a tread portion embedding belt layer therein, wherein the tread portion has plural rows of lug grooves extending from the tread end to a tire equatorial plane and a narrow groove connecting corresponding ends of two lug grooves on both sides of the tire equatorial plane, wherein the narrow groove will be closed when contacting the road surface, wherein: said lug groove is composed of a first lug groove portion located on the outer side in the tire widthwise direction and a second lug groove portion located on the inner side in the tire widthwise direction, wherein the maximum depth of the second lug groove portion is larger than the maximum depth of the first lug groove portion; said second lug groove portion, in a sectional view in the tire circumferential direction, is composed of a shallow groove portion, and a deep groove portion having a larger depth than the shallow groove portion notching a part of the shallow groove portion; and said deep groove portion further having a length in the tire circumferential direction, said length being smaller than the length in the tire circumferential direction of the shallow groove portion. In the structure described above, the maximum depth of the second lug groove portion is larger than the maximum depth of the first lug groove portion and a wear life of the second lug groove portion is longer than wear life of first lug groove portion. Therefore, when the first lug groove portion wear, the second lug groove portion maintain the edge element. Moreover, due to the edge element of the tread end, pressure of ground contact of edge portion increase conspicuously when stepping on, and when the tire is rotated with a load applied thereon, average road surface pressure of ground contact of the whole tread, in particular, road surface pressure of ground contact of tread end side will increase sufficiently. As a result, when the tire is rotated with a load applied thereon, slipping of the tread against the road surface will be prevented and uneven wear resistance will increase due to the reduction of the wear of treading surface of the tread portion. Therefore, area at a tire equatorial plane will not wear faster than the area at the tread ground end, and uneven wear will be prevented. The second lug groove portion is composed of a shallow groove portion and deep groove portion having a larger depth than the shallow groove portion notching a part of the shallow groove portion, and the rigidity of the second lug groove portion is larger with respect to the second lug groove portion with the uniform depth. As a result, excess collapse-deformation of second lug groove portion in the tire circumferential direction will be prevented caused by the friction of the tread rubber and the road surface when the tire is rotated with a load applied thereon. Moreover, since the length in the tire circumferential direction of the deep groove portion is smaller than the length in the tire circumferential direction of the shallow groove portion, when collapse-deformation of the second lug groove in the tire circumferential direction, deep groove portion will contact the road surface prior to the shallow groove portion and such contacting portion will sustain each other to prevent additional collapse-deformation of the shallow groove portion. Due to such prevention, slipping wear caused by the excess collapse-deformation will be suppressed. For such reason, slipping wear due to the collapse-deformation near the lug groove and uneven wear will be prevented for the tire as a whole.

Further, the depth of the shallow groove portion is preferably in the range of 30 to 40% the maximum depth of the second lug groove portion, and more preferably in a range of 32 to 35%.

Yet further, the length in the tire circumferential direction of the deep groove portion is preferably in the range of 65 to 75% the length in the tire circumferential direction of the shallow groove portion, and more preferably in a range of 67 to 72%.

Yet further, the second lug groove portion may extend, in a sectional view in the tire widthwise direction, preferably in the range of 20 to 30% with respect to the tread width, from the end portion of the first lug groove portion on the inner side of tire widthwise direction to the inner side in the tire widthwise direction, and more preferably in a range of 25 to 30%.

Yet further, the first lug groove may extend, in a sectional view in the tire widthwise direction, preferably in the range of 20 to 25% with respect to the tread width, from the tread end toward the tire equatorial plane in the tire widthwise direction, and more preferably in a range of 20 to 25%.

Yet further, the maximum depth of the first lug groove portion is preferably in the range of 20 to 35% deeper than the maximum depth of the first lug groove portion, and more preferably in a range of 25 to 30%.

Yet further, it is preferred that the tire is attached onto a rim to form tire wheel and the tire wheel is filled with regular internal-pressure, the configuration of the tread portion, in a sectional view in the tire widthwise direction, at the position distant from tire equatorial plane along tire widthwise direction in 25% of tread width, the maximum depth of the second lug groove portion will be 1 to 3% smaller with respect to that of the single radius profile. In the present specification, "proper inner pressure" represents the standard air pressure for the tire wheel composed of a tire and a standard rim thereof as described below. The standard refers to an effective industrial standard available at an area in which the tires are produced or used, respectively, e.g., "Year Book" published by The Tire and Rim Association Inc. in the United States, "Standards Manual" published by The European Tyre and Rim Technical Organization in Europe, and "JATMA YEAR BOOK" published by The Japan Automobile Tire Manufacturing Association, Inc. in Japan. Further, in the present specification, "single radius profile" represents the round shape virtually extending in equal length from the center position of the tire and rim sectional shape extending in a sectional view of the tire rim assembly in the tire widthwise direction in range of tire equatorial plane to the tread end.

Yet further, it is preferable that the tread portion has a center tire circumferential groove extending along tire circumferential direction on the tire equatorial plane, wherein the length in the tire widthwise direction of the center tire circumferential groove is 0.5 to 2.0% the length of the tread width, and the depth of the center tire circumferential groove is 60 to 70% of the maximum depth of the second lug groove.

Yet further, it is preferable that the tread portion has a pair of lateral tire circumferential groove extending along tire circumferential direction clipping the tire equatorial plane, wherein the length in the tire widthwise direction of the lateral tire circumferential groove is 0.5 to 2.0% the length of the tread width, and the depth of the lateral tire circumferential groove is smaller than the maximum depth of the second lug groove and is in the range of 1.0 to 2.5% with respect to the tread width.

Yet further, it is preferable that the lateral circumferential groove is arranged, in a sectional view in the tire widthwise direction, at the position distant from tire equatorial plane along tire widthwise direction in 25% of tread width. Moreover, it is preferable that the lateral circumferential groove is disposed outside the tire widthwise end of the belt layer in the tire widthwise direction.

| Explanation of Reference Symbols |  |
|---|---|
| 1 | Tire |
| 2 | Tread portion |
| 3 | Sidewall portion |
| 4 | Bead portion |
| 5 | Bead core |
| 6 | Carcass layer |
| 7 | Belt layer |
| 8 | Tire lumen |
| 9 | Inner liner |
| 10 | Tread end |
| 11 | Lag groove |
| 12 | Narrow groove |
| 13 | First lug groove |
| 14 | Second lug groove |
| 15 | Deep groove portion |
| 16 | Shallow groove portion |
| 17 | 25% position |
| 18 | Center tire circumferential groove |
| 19 | Lateral tire circumferential groove |
| End portion on the outer side in the widthwise direction of the belt layer | |
| R | Rim |
| CL | Tire equatorial plane |
| D1 | Maximum depth of the second lug groove portion |
| D2 | Maximum depth of the first lug groove portion |
| D3 | Depth of the shallow groove portion |
| D4 | Depth of the deep groove portion |
| D5 | Length of the deep groove potion in tire circumferential direction |
| D6 | Length of the shallow groove potion in tire circumferential direction |
| D7 | Tread width |
| X | Single radius profile |

BEST MODE FOR CARRYING OUT THE INVENTION

Figure 1:
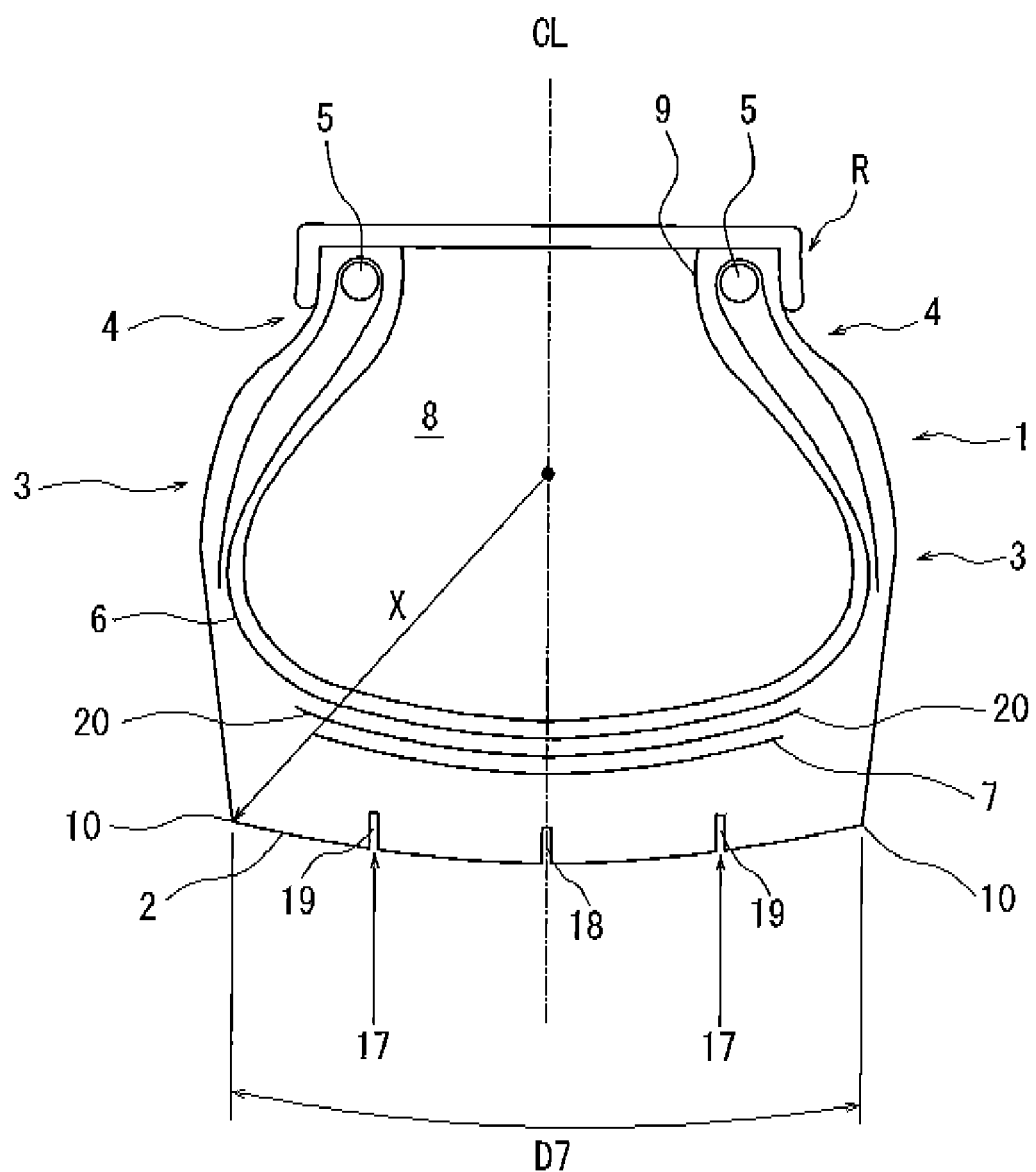
FIG. 1 is a sectional view in the tire widthwise direction of a tire rim assembly according to the present invention.
Figure 2:
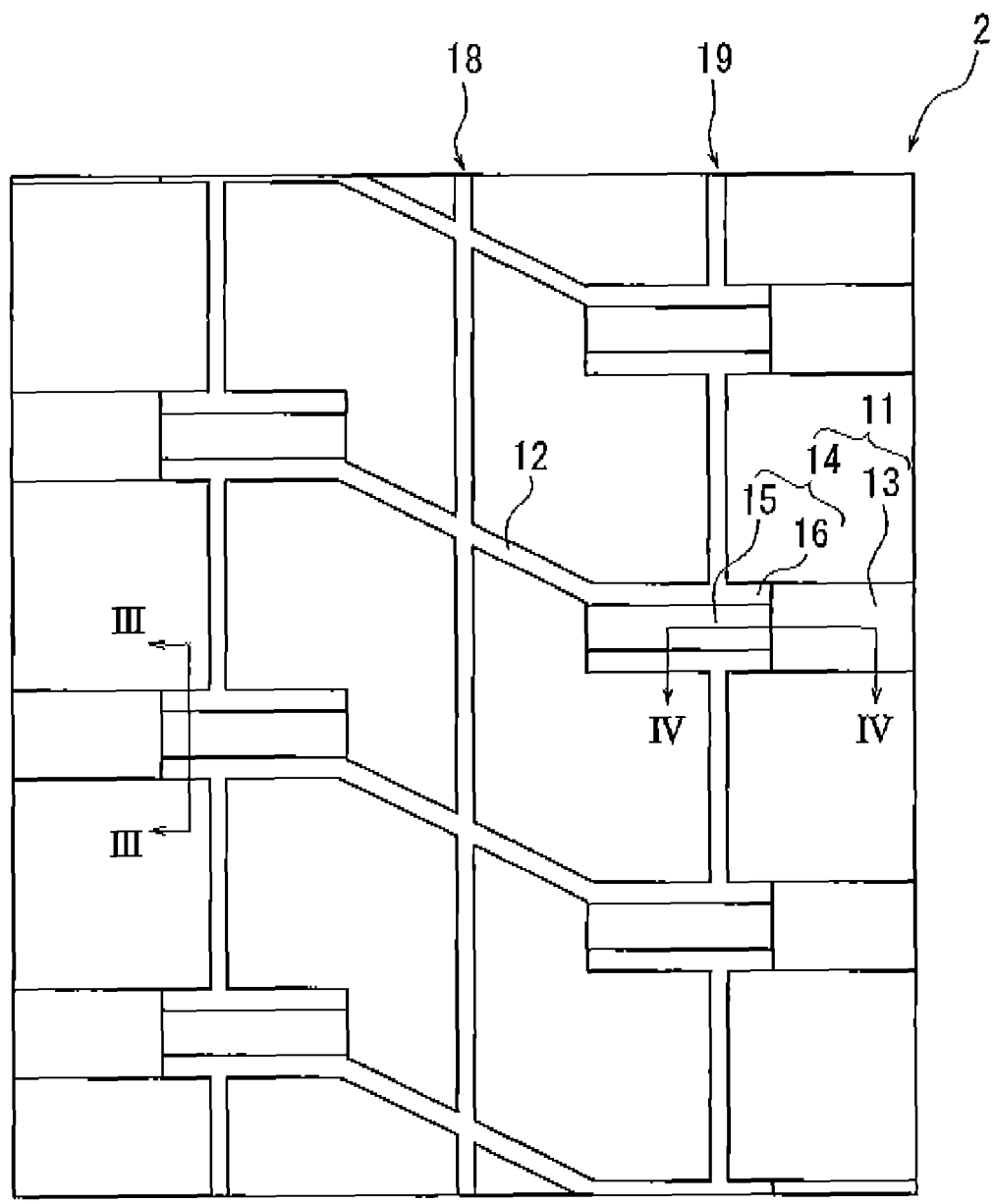
FIG. 2 is a developmental view of the tread of the tire in FIG. 1.
Figure 3:
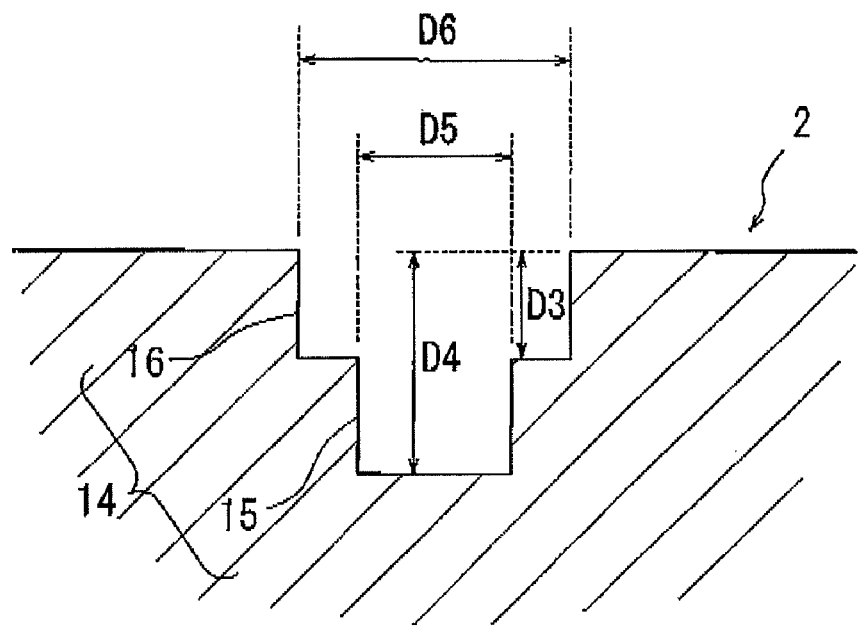
FIG. 3 is a sectional view of line III-III shown in FIG. 2.
Figure 4:
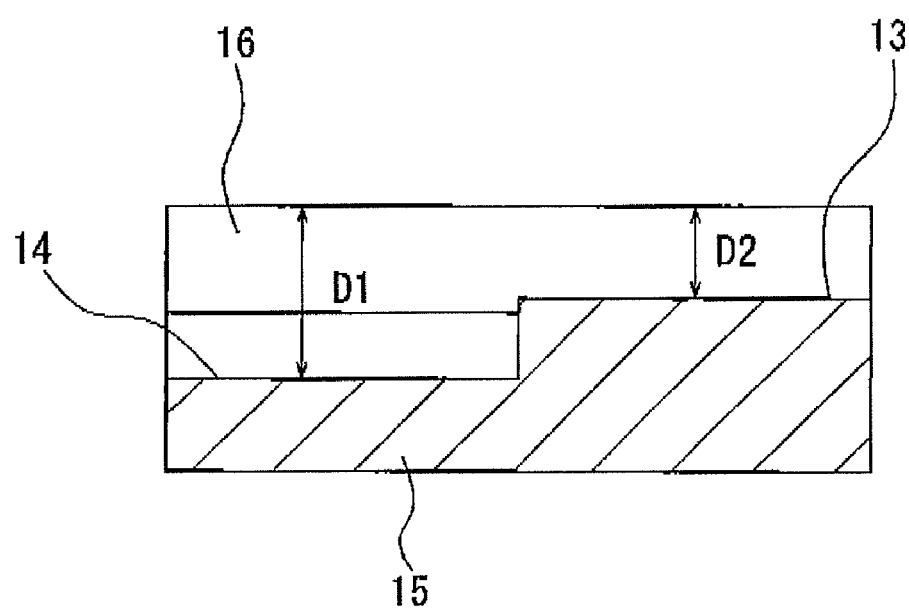
FIG. 4 is a sectional view of line IV-IV shown in FIG. 3.
Figure 5:
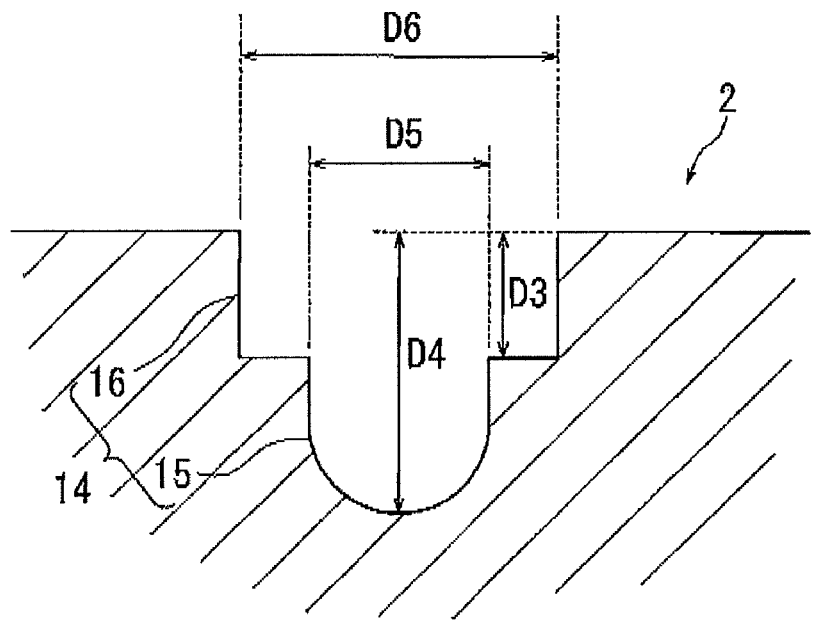
FIGS. 5A and 5B are a sectional view in the tire circumferential direction of a tire according to the present invention.
Figure 5:
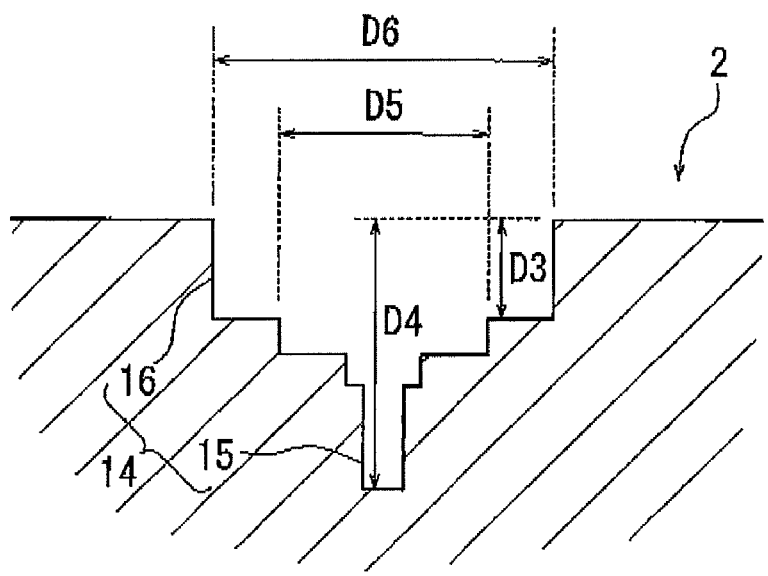
Figure 6:
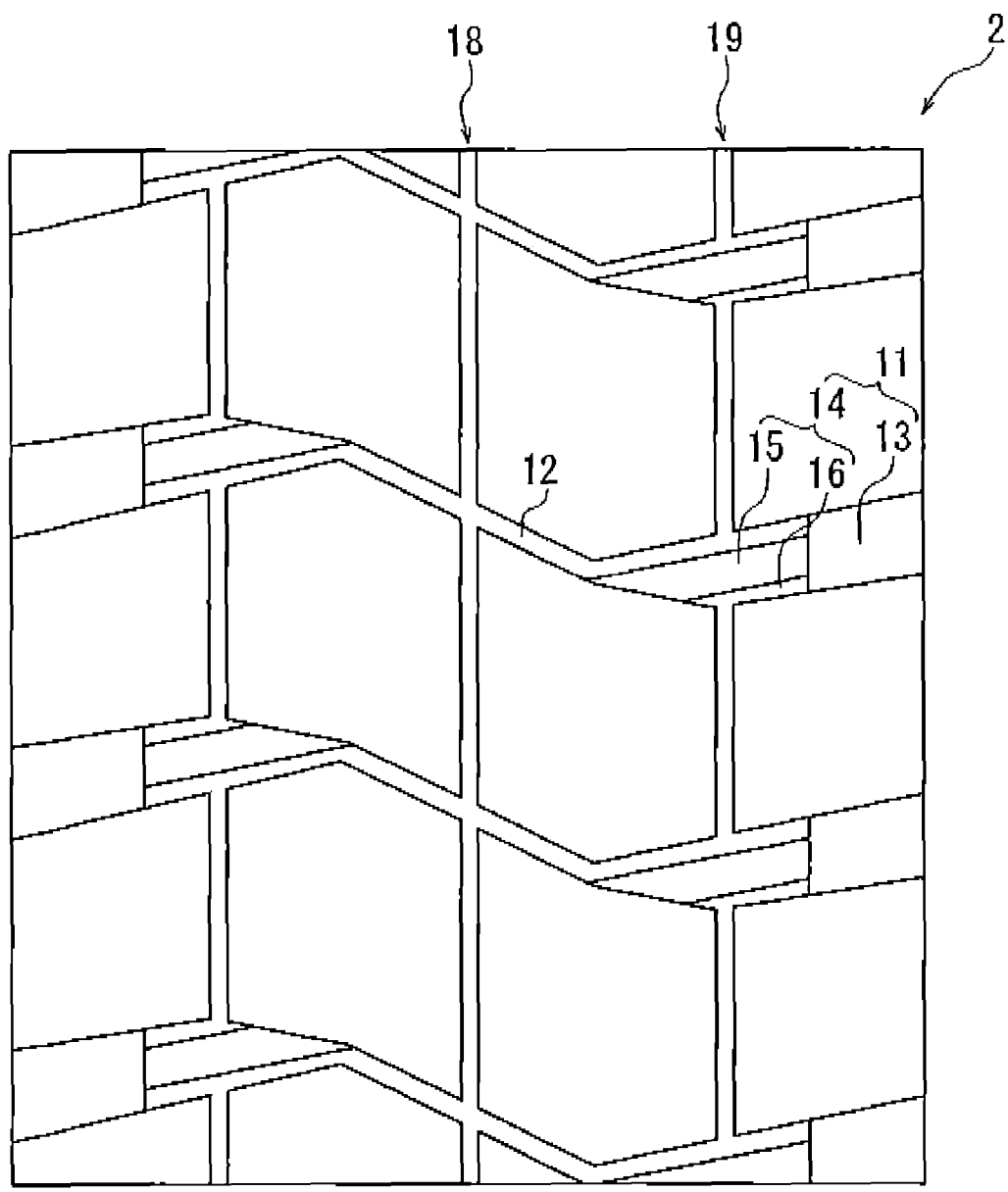
FIG. 6 is a partial developmental view of a tire according to the present invention

Hereinafter, an embodiment of the present invention will be described with reference to the drawings. FIG. 1 is a sectional view in the tire widthwise direction of a tire rim assembly according to the present invention (which will be referred to as "a tire" hereinafter). FIG. 2 is a developmental view of the tread of the tire in FIG. 1. FIG. 3 is a sectional view of line III-III shown in FIG. 2. FIG. 4 is a sectional view of line IV-IV shown in FIG. 3. FIGS. 5A and 5B are a sectional view in the tire circumferential direction of a tire according to the present invention. FIG. 6 is a partial developmental view of a tire according to the present invention Tire 1 of the present invention has tread portion 2 contacting road surface, a pair of sidewall portion 3 extending from both end side of the tread portion 2, a pair of bead portion 4 located inner side in the tire radial direction of each sidewall portion 3 which fits to the rim R, as conventionally. A bead portion 4 of the tire 2 includes a carcass layer 6 extending in a toroidal shape over respective bead core 5, 5 embedded in the bead portion 4, and a belt layer 7 located outside the crown area of the carcass layer 6 to reinforce the tread portion 2. Moreover, air impermeable inner liner 9 is located inside the tire 11.*e.* the inner liner 9 is located at the tire lumen 8 side inside the tire 1 and rim R assembly. The tire 1 of present invention has plural rows of lug grooves 11 extending from the tread end 10 to a tire equatorial plane CL and a narrow groove 12 connecting the end of two lug grooves 11 clipping the tire equatorial plane CL, wherein the narrow groove 12 will be closed when contacting the road surface. The lug groove 11 is composed of a first lug groove portion 13 located on the outer side in the tire widthwise direction and a second lug groove portion 14 located on the inner side in the tire widthwise direction, wherein the maximum depth D1 of the second lug groove portion 14 is larger than the maximum depth D2 of the first lug groove portion 13. The second lug groove portion 14, in a sectional view in the tire circumferential direction, is composed of a shallow groove portion 16 and deep groove portion 15 having a larger depth D4 than the depth D5 of the shallow groove portion 16 notching a part of the shallow groove portion 16. The length D5 in the tire circumferential direction of the deep groove portion 15 is smaller than the length D6 in the tire circumferential direction of the shallow groove portion 16. In the structure described above, the maximum depth D1 of the second lug groove portion 14 is larger than the maximum depth D2 of the first lug groove portion 13 and a wear life of the second lug groove portion 14 is longer than wear life of first lug groove portion 13. Therefore, when the first lug groove portion 13 wear, the second lug groove portion 14 maintain enough edge element. Moreover, due to the edge element of the tread end, pressure of ground contact of edge portion increase conspicuously when stepping on, and when the tire is rotated with a load applied thereon, average road surface pressure of ground contact of the whole tread, in particular, road surface pressure of ground contact of tread end side will increase sufficiently. As a result, when the tire is rotated with a load applied thereon, slipping of the tread against the road surface will be prevented and uneven wear resistance will increase due to the reduction of the wear of treading surface of the tread portion. Therefore, area at a tire equatorial plane CL will not wear faster than the area at the tread ground end, and uneven wear will be prevented. The second lug groove portion 14 is composed of a shallow groove portion 16 and deep groove portion 15 having a larger depth D4 than the depth D3 of shallow groove portion 16, and the rigidity of the second lug groove portion 14 is larger with respect to the second lug groove portion with the uniform depth. As a result, excess collapse-deformation of second lug groove portion 14 in the tire circumferential direction will be prevented caused by the friction of the tread rubber and the road surface when the tire is rotated with a load applied thereon. Moreover, since the length D5 in the tire circumferential direction of the deep groove portion 15 is smaller than the length D6 in the tire circumferential direction of the shallow groove portion 16, when collapse-deformation of the second lug groove 14 in the tire circumferential direction, deep groove portion 15 will contact the road surface prior to the shallow groove portion 16 and such contacting portion will sustain each other to prevent additional collapse-deformation of the shallow groove portion 16. Due to such prevention, slipping wear caused by the excess collapse-deformation will be suppressed. For such reason, slipping wear due to the collapse-deformation near the lug groove 11 and uneven wear will be prevented for the tire as a whole. Tire life will elongate due to the prevention of uneven wear for the whole tire.

Yet further, the depth D3 of the shallow groove portion 16 is preferably in the range of 30 to 40% the maximum depth D1 of the second lug groove portion 14, and more preferably in a range of 32 to 35%. Further, the depth of the shallow groove portion is smaller than the depth of the second lug groove portion. In a case in which the depth D3 of the shallow groove portion 16 is smaller than 30% the maximum depth D1 of the second lug groove portion 14, even though the deep groove portion 15 is in contact with the road surface when the tire is rotated with a load applied thereon, depth D3 of the shallow groove portion is not enough, and therefore, ability of lug groove will not exhibited. Therefore, driving ability will reduce due the lack of driving force and breaking ability on the road having uneven surface. On the other hand, in a case in which the depth D3 of the shallow groove portion 16 is larger than 40% the maximum depth D1 of the second lug groove portion 14, the depth D3 of the shallow groove portion 16 is too large and the rigidity of tread portion 2 near the second lug groove portion 14 will not increase enough, resulting in reduction of uneven wear resistance since the excess collapse-deformation near the second lug groove portion 14 is not prevented enough when the tire is rotated with a load applied thereon.

Yet further, the length in the tire circumferential direction D5 of the deep groove portion 15 is preferably in the range of 65 to 75% the length in the tire circumferential direction D6 of the shallow groove portion 16, and more preferably in a range of 67 to 72%. In a case in which the length in the tire circumferential direction D5 of the deep groove portion 15 is smaller than 65% the length in the tire circumferential direction D6 of the shallow groove portion 16, enough size of groove bottom can not be made and when stepping in or out with the tire rotated with a load applied thereon, excess stress will be applied to the groove bottom caused by the opening and closing of the groove bottom, resulting in reduction of groove bottom crack ability. On the other hand, in a case in which the length in the tire circumferential direction D5 of the deep groove portion 15 is larger than 75% the length in the tire circumferential direction D6 of the shallow groove portion 16, the length in the tire circumferential direction D5 of the deep groove portion 15 is too large and the rigidity of tread portion 2 on the bottom of the second lug groove portion 14 will not increase enough, resulting in reduction of uneven wear resistance since the excess collapse-deformation near the second lug groove portion 14 is not prevented enough when the tire is rotated with a load applied thereon.

Yet further, the second lug groove portion 14 extend, in a sectional view in the tire widthwise direction, preferably in the range of 20 to 30% with respect to the tread width D7, from the end portion of the first lug groove portion 13 on the inner side of tire widthwise direction to the inner side in the tire widthwise direction, and more preferably in a range of 25 to 30%. Inventor has found from the driving test that, when the tire is rotated with a load applied thereon, in a sectional view in the tire widthwise direction, at the position 17 distant from tire equatorial plane CL along tire widthwise direction in 25% of tread width D7 (which will be referred to as "25% position 17" hereinafter), the lug groove 11 tends to collapse-deform and wear faster than the other part of the tread portion. Therefore, if the 25% position 17 is included within the shallow groove portion 17, reduction of rigidity of tread portion at the 25% position 17 is prevented, resulting in prevention of uneven wear.

Yet further, the first lug groove 13 extend, in a sectional view in the tire widthwise direction, preferably in the range of 20 to 25% with respect to the tread width D7, from the tread end 10 toward the tire equatorial plane CL in the tire widthwise direction, and more preferably in a range of 20 to 25%. In a case in which the first lug groove 13 extend, in a sectional view in the tire widthwise direction, smaller than 20% with respect to the tread width D7, even though the second lug groove portion 13 wear, edge element of the second lug groove portion 14 is maintained enough, and road surface contacting pressure at the tread end side when the tire is rotated with a load applied thereon. Therefore, uneven wear resistance ability will reduce due the lack of prevention of slip of tread portion against the road surface. On the other hand, in a case in which the first lug groove 13 extend, in a sectional view in the tire widthwise direction, larger than 25% with respect to the tread width D7, when the first lug groove portion 13 wear, edge element of the second lug groove portion 14 is not enough and the edge element only of the second lug groove portion 14 is not enough, resulting in reduction of traction ability.

Yet further, the maximum depth D1 of the second lug groove portion 14 is preferably in the range of 20 to 35% deeper than the maximum depth D2 of the first lug groove portion 13, and more preferably in a range of 25 to 30%. In a case in which the maximum depth D2 of the first lug groove portion 13 is smaller than 120% the maximum depth D1 of the second lug groove portion 14, even though the maximum depth D1 of the second lug groove portion 14 is enough, the maximum depth D2 of the first lug groove portion 13 is not enough, resulting in the fast wear of the first lug groove portion 13. Therefore, traction ability will decrease fast due to the failure of edge element of the first lug groove portion 13 for enough period of time. On the other hand, in a case in which the maximum depth D1 of the second lug groove portion 14 is larger than 135% the maximum depth D2 of the first lug groove portion 13, rigidity of the first lug groove portion 13 decreases and wear at the groove portion will not be sufficient.

Yet further, it is preferably that the tire 1 is attached onto a rim R to form tire wheel and the tire wheel is filled with regular internal-pressure, the configuration of the tread portion, in a sectional view in the tire widthwise direction, at the 25% position 17 of the tread width D7, the maximum depth D1 of the second lug groove portion 14 will be 1 to 3% smaller with respect to that of the single radius profile X. Inventor found from the result of the experiment that, when the tire is rotated with a load applied thereon, deformation at the 25% position 17 due to the centrifugal force of the tire occurs to the outer side of the tire widthwise and radial direction, resulting in the fast wear at the 25% position 17 with respect to the other area of the tread portion by the friction force against the road surface. Therefore, by making 25% position 17 at the tread portion 2 smaller than the single radius profile X, contacting with the excess protrusion of the road surface contacting area against the road surface will be prevented, resulting in the uniform wear of the tread portion caused by the prevention of the wear at the 25% position 17. In case in which the maximum depth D1 of the second lug groove portion 14 is smaller than 1% with respect to that of the single radius profile X at the 25% position 17 of the tread width D7, when the tire is rotated with a load applied thereon, deformation at the 25% position 17 due to the centrifugal force of the tire occurs to the outer side of the tire widthwise and radial direction is not prevented sufficiently and the fast wear at the 25% position 17 is not prevented. On the other hand, in case in which the maximum depth D1 of the second lug groove portion 14 is larger than 3% with respect to that of the single radius profile X at the 25% position 17 of the tread width D7, the thickness of the rubber of the tread portion 2 at the 25% position 17 will be deficient, resulting in the shortage of tire life due to the exposure of the belt layer 7 by the wear.

Yet further, it is preferable that the tread portion 2 has a center tire circumferential groove 18 extending along tire circumferential direction on the tire equatorial plane CL, wherein the length in the tire widthwise direction of the center tire circumferential groove 18 is 0.5 to 2.0% the length of the tread width D7, and the depth of the center tire circumferential groove 18 is 60 to 70% of the maximum depth D1 of the second lug groove 14. Generally, belt layer 7 will be heat origin caused by the continuous deformation due the tire rotation with a load applied thereon. With such occurrence of the heat, the tread portion will be destroyed due to the storage of excess heat at the tread portion 2. Therefore, by making the depth of the center tire circumferential groove 18 in the range described above, the center tire circumferential groove 18 will be located near the belt layer 7 to let the heat from the belt layer 7 radiate from the center tire circumferential groove 18, resulting in the prevention of destroying the tread portion 2 due to the heat storage. Moreover, as described above, heat will be radiated efficiently and the tread width D7 of the center tire circumferential groove 18 is set in the small range, and the wear velocity will reduce since the volume of the tread rubber is maintained.

Yet further, it is preferable that the tread portion 2 has a pair of lateral tire circumferential groove 19 extending along tire circumferential direction clipping the tire equatorial plane CL, wherein the length in the tire widthwise direction of the lateral tire circumferential groove 19 is 0.5 to 2.0% the length of the tread width D7, and the depth of the lateral tire circumferential groove 19 is smaller than the maximum depth D1 of the second lug groove 14 and is in the range of 1.0 to 2.5% with respect to the tread width D7. Generally, as described above, belt layer 7 will be heat origin caused by the continuous deformation due the tire rotation with a load applied thereon. With such occurrence of the heat, the tread portion will be destroyed due to the storage of excess heat at the tread portion 2. Therefore, by making the depth of the lateral tire circumferential groove 19 in the range described above, the lateral tire circumferential groove 19 will be located near the belt layer 7 to let the heat from the belt layer 7 radiate from the lateral tire circumferential groove 19, resulting in the prevention of destroying the tread portion 2 due to the heat storage. Moreover, as described above, heat will be radiated efficiently and the tread width D7 of the lateral tire circumferential groove 19 is set in the small range, and the wear velocity will reduce since the volume of the tread rubber is maintained.

Yet further, it is preferable that the lateral circumferential groove 19 is arranged, in a sectional view in the tire widthwise direction, at the position distant from tire equatorial plane CL along tire widthwise direction with the 25% of the tread width D7. In case which the lateral circumferential groove 19 is arranged, in a sectional view in the tire widthwise direction, at the position no more distant from tire equatorial plane CL along tire widthwise direction with the 25% of the tread width D7, when the contacting surface of the tread portion 2 pulled to the tire widthwise direction with the friction of contacting surface of the tread portion against the road surface, when tire is rotating with a load applied thereon, friction force due to the friction force of the contacting surface of the tread portion out side in the tire widthwise direction against the road surface can not be dispersed to a number of block land portion with the lateral circumferential groove 19. Therefore, excess amount of friction force will be applied to the contacting surface of the tread portion out side in the tire widthwise direction, and collapse-deformation in the tire widthwise direction occurs excessively which result in the decrease of the uneven wear resistance. Moreover, it is preferable that the lateral circumferential groove 19 is disposed outside the tire widthwise end 20 of the belt layer 7 in the tire widthwise direction. In case which the lateral circumferential groove 19 is disposed inside in the tire widthwise direction with respect to the tire widthwise end 20 of the belt layer 7, rigidity of the land portion near the lateral circumferential groove 19 is low and the deformation of the belt layer 7, when the tire is rotated with a load applied thereon, excessive deformation of the tread portion 2 near the lateral circumferential groove 19 occur due to the deformation of belt layer 7, resulting in the reduction of uneven wear resistance.

The foregoing descriptions show only a part of possible embodiments of the present invention, and the aforementioned structures may be combined, interchanged or subjected to various modifications unless such modifications digress from the sprit of the present invention. For example, the shape of bottom of the deep groove portion 15 can be winded shape as show in FIG. 5A, or the shape of bottom of the deep groove portion 15 can be ladder shape as show in FIG. 5B. Furthermore, as shown in FIG. 6, lug groove can extend in inclined direction to the tire circumferential direction.

EXAMPLES

Next, tire having the conventional tread pattern (Conventional tire) and tire having tread pattern according to the present invention (Examples tires) were prepared at the size of 46/90R57 as a tire for the heavy load and the performances thereof were evaluated, respectively. Details thereof will be described below.

Conventional tire has narrow groove and lug groove with uniform depth in the tread portion, and has characteristics as shown in Table 1. Example tire has a lug groove that is composed of a first lug groove portion located on the outer side in the tire widthwise direction and a second lug groove portion located on the inner side in the tire widthwise direction, and a narrow groove. The first lug groove extend, in a sectional view in the tire widthwise direction, in the range of 20 to 25% with respect to the tread width, from the tread end toward the tire equatorial plane in the tire widthwise direction. The second lug groove portion extend, in a sectional view in the tire widthwise direction, in the range of 20 to 30% with respect to the tread width, from the end portion of the first lug groove portion on the inner side of tire widthwise direction to the inner side in the tire widthwise direction. The lug groove is composed of a first lug groove portion located on the outer side in the tire widthwise direction and a second lug groove portion located on the inner side in the tire widthwise direction, wherein the maximum depth of the second lug groove portion is larger than the maximum depth of the first lug groove portion, wherein the second lug groove portion, in a sectional view in the tire widthwise direction, is composed of a shallow groove portion and deep groove portion having a larger depth than the shallow groove portion notching a part of the shallow groove portion, wherein the length in the tire circumferential direction of the deep groove portion is smaller than the length in the tire circumferential direction of the shallow groove portion. When the tire is attached onto a rim to form tire wheel and the tire wheel is filled with regular internal-pressure, the configuration of the tread portion, in a sectional view in the tire widthwise direction, at the position distant from tire equatorial plane along tire widthwise direction in 25% of tread width, the maximum depth of the second lug groove portion will be 1 to 3% smaller with respect to that of the single radius profile. Further, Example tire has characteristics as shown in Table 1

TABLE 1

|  | Tread Gauge | Tread outer diameter | Tread width | Maximum depth of the lag groove | Length of the lag groove in tire circumferential direction | Maximum depth of the first lag groove portion | Maximum depth of the second lag groove portion |
| --- | --- | --- | --- | --- | --- | --- | --- |
| Conventional tire | 112 mm | 3578mm | 1030 mm | 110 | 70 | — | — |
| Example tire | 112 mm | 3578 mm | 1030 mm | 97 | 70 | 72 | 97 |

|  | Length of the first lag groove portion in tire circumferential direction | Length of the second lag groove portion in tire circumferential direction | Depth of the shallow groove portion | Depth of the deep groove portion | Length of the shallow groove portion in tire circumferential direction | Length of the deep groove portion in tire circumferential direction |
| --- | --- | --- | --- | --- | --- | --- |
| Conventional tire | — | — | — | — | — | — |
| Example tire | 70 | 60 | 37 | 97 | 16.8 | 60 |

The Example tires and Conventional Example tires were assemble with rims of predetermined size having size of 29.00×6.0 to obtain a tire wheel, which was then mounted to a test dump truck vehicle, as a driving wheel (rear wheel) and steering wheel (front wheel); and an air pressure of 700 kPa (relative pressure) and a load of 608 kN were applied. Wear resistance has been evaluated by driving the test vehicle at area A, B and C until the exposure of the belt layer occurs due to the wear by the visual inspection, by measuring wear amount at the tire equatorial plane and 25% position, and by measuring the duration until the exchange of the wheel. The evaluation results in Table 2 are expressed as index ratios with respect to the wear resistance and tire life of the Conventional tire, which the wear resistance and tire life of the Conventional tires being converted to 100, respectively. The larger evaluation values indicate the better performances. The evaluation results of the tests are shown in Table 2.

TABLE 2

| Area | A Area | | B Area | | C Area | |
|---|---|---|---|---|---|---|
| Test number | 27 wheels | | 14 wheels | | 19 wheels | |
| location of measuring wear amount | Tire equatorial plane | 25% position | Tire equatorial plane | 25% position | Tire equatorial plane | 25% position |
| Wear amount  front wheel | 118 | 122 | 105 | 107 | 115 | 109 |
| rear wheel | 110 | 115 | 108 | 102 | 115 | 117 |
| tire life | 113 | | 104 | | 115 | |
| Belt exposure position after the wear | tire equatorial plane | | 25% position | | tire equatorial plane and 25% position | |

As shown by the results in Table 2, wear amount of the tread portion for the whole tread has been reduced and the evaluated wear life has increased for the Example tires in all areas as compared with the Conventional tire, even though there is a difference in evaluation result of belt exposure position and antifriction index caused by the difference of road surface situation in each area.

INDUSTRIAL APPLICABILITY

As is obvious from the results described above, there can be obtained a pneumatic tire in which the tread pattern is optimized to enhance the wear resistance.

The invention claimed is:

1. A pneumatic tire having a tread portion embedding belt layer therein, wherein the tread portion has plural rows of lug grooves extending from the tread end to a tire equatorial plane and a narrow groove connecting corresponding ends of two lug grooves on both sides of the tire equatorial plane, wherein the narrow groove will be closed when contacting the road surface, wherein:

said lug groove is composed of a first lug groove portion located on the outer side in the tire widthwise direction and a second lug groove portion located on the inner side in the tire widthwise direction, wherein the maximum depth of the second lug groove portion is larger than the maximum depth of the first lug groove portion;

said second lug groove portion, in a sectional view in the tire circumferential direction, is composed of a shallow groove portion, and a deep groove portion having a larger depth than the shallow groove portion and notching a part of the shallow groove portion;

said deep groove portion further having a length in the tire circumferential direction, said length being smaller than the length in the tire circumferential direction of the shallow groove portion; and in a sectional view in the tire widthwise direction, a stepped portion extending in the depth direction of the lug groove is provided between the first lug groove portion and each of the deep groove portion and the shallow groove portion.

2. The pneumatic tire of claim 1, wherein the depth of the shallow groove portion is in the range of 30 to 40% the maximum depth of the second lug groove portion.

3. The pneumatic tire of claim 1, wherein the length in the tire circumferential direction of the deep groove portion is in the range of 65 to 75% the length in the tire circumferential direction of the of the shallow groove portion.

4. The pneumatic tire of claim 1, wherein the second lug groove portion extends, in a sectional view in the tire widthwise direction, in the range of 20 to 30% with respect to the tread width, from the end portion of the first lug groove portion on the inner side of tire widthwise direction to the inner side in the tire widthwise direction.

5. The pneumatic tire of claim 1, wherein the first lug groove extend, in a sectional view in the tire widthwise direction, in the range of 20 to 25% with respect to the tread width, from the tread end toward the tire equatorial plane in the tire widthwise direction.

6. The pneumatic tire of claim 1, wherein the maximum depth of the second lug groove portion is in the range of 20 to 35% deeper than the maximum depth of the first lug groove portion.

7. The pneumatic tire of claim 1, wherein the tire is attached onto a rim to form a tire wheel and the tire wheel is filled with regular internal-pressure, the configuration of the tread portion, in a sectional view in the tire widthwise direction, at the position distant from tire equatorial plane along tire widthwise direction in 25% of tread width, the maximum depth of the second lug groove portion will be 1 to 3% smaller with respect to that of a single radius profile.

8. The pneumatic tire of claim 1, wherein the tread portion has a center tire circumferential groove extending along tire circumferential direction on the tire equatorial plane, wherein the length in the tire widthwise direction of the center tire circumferential groove is 0.5 to 2.0% the length of the tread width, and the depth of the center tire circumferential groove is in the range of 60 to 70% with respect to the maximum depth of the second lug groove portion.

9. The pneumatic tire of claim 1, wherein the tread portion has a pair of lateral tire circumferential grooves extending along the tire circumferential direction, one lateral tire circumferential groove provided on each side of the tire equatorial plane, wherein the length in the tire widthwise direction of the lateral tire circumferential grooves is 0.5 to 2.0% the length of the tread width, and the depth of the lateral tire circumferential grooves is smaller than the maximum depth of the second lug groove portion and is in the range of 1.0 to 2.5% with respect to the tread width.

10. The pneumatic tire of claim 9, wherein, in a sectional view in the tire widthwise direction, the lateral circumferential grooves are each arranged at a position along the tire widthwise direction in a range of 25% of the tread width from the tread end.

* * * * *